United States Patent
Retnakumari et al.

(10) Patent No.: US 11,132,330 B2
(45) Date of Patent: Sep. 28, 2021

(54) SELF-ARCHIVING DATABASE

(71) Applicant: Software AG, Darmstadt (DE)

(72) Inventors: Sanju Krishnan Retnakumari, Bangalore (IN); Manish Negandhi, Bangalore (IN)

(73) Assignee: Software AG, Darmstadt (DE)

( * ) Notice: Subject to any disclaimer, the term of this patent is extended or adjusted under 35 U.S.C. 154(b) by 221 days.

(21) Appl. No.: 16/041,981

(22) Filed: Jul. 23, 2018

(65) Prior Publication Data

US 2020/0026775 A1    Jan. 23, 2020

(51) Int. Cl.
*G06F 16/11*    (2019.01)
*G06F 16/23*    (2019.01)

(52) U.S. Cl.
CPC ........ *G06F 16/113* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 9,626,394 B2 | 4/2017 | Schmidt et al. | |
| 10,108,690 B1* | 10/2018 | Murray | G06F 16/278 |
| 2003/0220938 A1 | 11/2003 | Norcott | |
| 2009/0198729 A1 | 8/2009 | Gong | |
| 2011/0067113 A1* | 3/2011 | Jones | H04L 63/105 |
| | | | 726/27 |
| 2012/0158669 A1* | 6/2012 | Morsi | G06F 16/125 |
| | | | 707/689 |
| 2014/0095443 A1* | 4/2014 | Draese | G06F 16/27 |
| | | | 707/661 |
| 2015/0106407 A1* | 4/2015 | Adayilamuriyil | G06F 16/284 |
| | | | 707/804 |
| 2017/0109377 A1* | 4/2017 | Baer | G06F 16/9535 |
| 2018/0060335 A1* | 3/2018 | Acharya | G06F 16/113 |

(Continued)

OTHER PUBLICATIONS

Snaidero, Ben, "Archiving SQL Server data using partitioning", Edgewood Solutions, LLC, Oct. 11, 2012 [Online] Printed Jun. 17, 2018. <https://www.mssqltips.com/sqlservertip/2780/archiving-sql-server-data-using-partitioning/>.

(Continued)

*Primary Examiner* — Dawaune A Conyers
(74) *Attorney, Agent, or Firm* — Posz Law Group, PLC

(57) ABSTRACT

In a database system, an archive table data specifies a pre-defined archive time period based on which a periodic archive procedure is performed and a pre-defined purge time period based on which a periodic purge procedure is performed. Based on the periodic archive time period being reached, a new partition is created in a transaction database, which is used as a live partition into which the database stores transaction records which are new; and an expired transaction database partition is moved to the archive database using a database partition feature whereby data in the partition is moved as a whole. Based on the periodic purge time period being reached, an expired archive database partition is removed from the archive database using the database partition feature, wherein data is deleted as a whole from the archive database based on the archive database partition being removed.

18 Claims, 8 Drawing Sheets

(56) References Cited

U.S. PATENT DOCUMENTS

2018/0089239 A1    3/2018  Gattegno et al.

OTHER PUBLICATIONS

Sundar, Nat, "Implementation of Sliding Window Partitioning in SQL Server to Purge Data", Edgewood Solutions, LLC, Feb. 22, 2018 [Online] Printed Jun. 17, 2018. <https://www.mssqltips.com/sqlservertip/5296/implementation-of-sliding-window-partitioning-in-sql-server-to-purge-data/>.

Horolskiy, Roman, "SQL Server: utilize partitioning to purge large tables", Redgate, Jul. 17, 2015 [Online] Printed Jun. 17, 2018. <http://www.sqlservercentral.com/blogs/forrards-group-database-blog/2015/07/17/sql-server-utilize-partitioning-to-purge-large-tables/>.

"Table partitioning for archiving data" Jul. 2, 2012 [Online] Printed Jun. 17, 2018. <https://dba.stackexchange.com/questions/20265/table-partitioning-for-archiving-data>.

* cited by examiner

SELF-ARCHIVING DATABASE

TECHNICAL FIELD

The technical field relates in general to databases, and more specifically to archiving of a database.

BACKGROUND

Many organizations depend on application solutions to manage business information and business process. These application accumulate large volumes of data, consuming much memory.

Most of the enterprise systems use relational databases to store data required for the solution. The data can be configuration data, which is typically managed by an Administrator, or transactional data, which is generated by the systems in the solution, while performing the actual business transactions. The transaction data generated by most of the systems will be huge and can run into millions of records every day.

Large amounts of transaction data can impact the performance of the software systems. It can also create data management issues where the storage, back-up processes, regular database maintenance and the like will have to deal with this large volume of data. For most businesses, most of this data is actually not required for the current or future transaction processing. However, there might be requirements for retaining the historical data for a certain time period, such as for audit or legal purposes. This might also be required for statistical information and analysis and business intelligence.

The standard practice followed to address this problem is to archive the data from the transaction database to an archive database (or schema) after a specified duration. After this, the data can be permanently removed (purged) from archive database, once the archive data is stored for a specified period of time. Though this is a common requirement for all kinds of software solutions, no relational databases currently have out of the box capability to archive and delete (purge) the data automatically. This forces the developers to create a solution for archiving the data using scripts or third party products. This has several disadvantages mentioned in the sections below, mainly being inefficiency, time of execution and the competency required to create an archiving solution.

SUMMARY

Accordingly, one or more embodiments provide a method, a system, and/or a non-transitory computer readable medium for a self-archiving database.

In an embodiment, a self-archiving method for a database system includes providing, in the database system, an archive table that pre-defines an archive time period and a purge time period. Also included is determining, in the database system, that a next time period for archive is reached based on the archive time period, and then creating, using a database partition feature, a new partition in a transaction database which is used as a live partition into which the database stores transaction records which are new, and performing a partition move, using the database partition feature, of an expired transaction partition from the transaction database to the archive database, wherein the transaction records in the expired transaction partition become members of a newest archive database partition of the archive database. Also included is determining, in the database system, that a next time period for purging is reached based on the purge time period, and then removing, by the database system, using the database partition feature, an expired archive partition from the archive database, wherein the transaction records in the expired archive partition are deleted as a whole from the archive database based on the archive database partition being removed.

In another embodiment, a database system stores transaction records into a transaction database. The system includes a storage memory storing the transaction database; and a processor cooperatively operable with the storage memory. The processor provides, in the storage memory, archive table data that specifies, for the transaction database, archive parameters which indicate a pre-defined archive time period based on which a periodic archive procedure is performed and purge parameters which indicate a pre-defined purge time period based on which a periodic purge procedure is performed, wherein each transaction database partition of the transaction database and each archive database partition of the archive database is created with a pre-defined expiry.

Based on the archive parameters indicating that a next time period for archive is reached: the processor creates, in the transaction database, a new partition which is used as a live partition into which the database stores new transaction records; and moves, using a database partition feature, to the archive database, a transaction database partition which determined to be expired, wherein the transaction records in the expired transaction database partition become members of a newest archive database partition of the archive database.

Based on the purge parameters indicating that a next time period for purging is reached, the processor removes, using the database partition feature, from the archive database, an archive database partition which is determined to be expired, wherein data is deleted as a whole from the archive database based on the archive database partition being removed.

The archive parameters may further indicate a transaction table value or foreign key reference with which the archive time period is used on which the archive procedure is based, to archive transaction records from the transaction database into the archive database. The purge parameters may further indicate a transaction table value or foreign key reference with which the purge time period is used on which the purge procedure is based, to purge transaction records from the archive database.

The purge parameters or archive parameters may further indicate a partition range or partition interval.

A global configuration table may be created that has details on table level archive and purge parameters which can be configured at a schema level for tables in the transaction database, and which can be customized as table level parameters.

A structured query language (SQL) statement may specify the archive parameters for a time based archive. An SQL statement may specify the archive parameters based on a reference approach.

A structured query language (SQL) statement may the purge parameters for a time based purge. An SQL statement may specify the purge parameters based on a reference approach.

A purge-archive column type may be specified which is specific to archiving or purging, which causes the processor to automatically archive a transaction table which is determined to include the purge-archive column.

The archive table data may be created based on archive parameters defined in a transaction table of the transaction database.

It should be noted that also disclosed herein are a method and non-transitory, computer-readable storage medium featuring the functionality described above.

One, or a combination of more than one, or all, of the above embodiments, can be combined and provided as a single embodiment.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. Introduction

Figure 1:
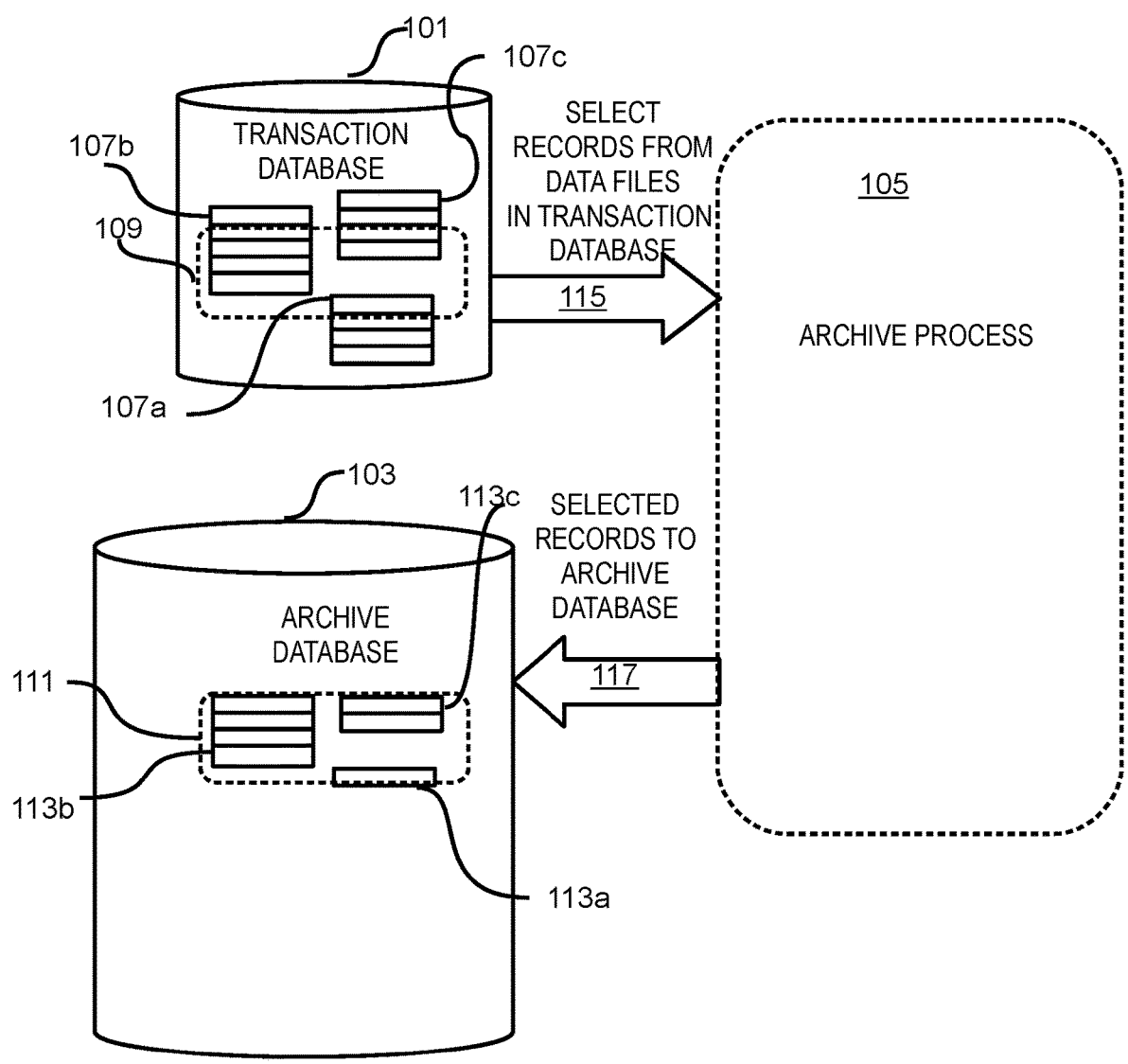
FIG. 1 is a diagram illustrating a conventional archive approach.

In overview, the present disclosure concerns a database design which will automatically take care of the archiving and purging of data. More particularly, various inventive concepts and principles are embodiments in systems, devices, and methods therein such that the design for storage of data itself will take care of archiving and purging the data after a pre-configured expiry time. Furthermore, the concepts discussed herein can rely in part on an existing database technique of a "partition", but which has never before been exploited for automatic archiving and purging. The concepts discussed herein can be particularly useful for transaction data, and/or any other data that creates a high volume of records in, for example, a relational database.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

As further discussed herein below, various inventive principles and combinations thereof are advantageously employed to reduce the inefficiency, time of execution, and competency required to archive database records, especially for systems that have a large volume of transaction records, such as in a relational database; the archiving and purging can be controlled as an integral part of the database itself, and can utilize the existence of partitions provided by the database itself.

II. Context

A. Overview—State of the Art and Observations

In the past few years, there has been a continuous evolution of technologies and products that store and manipulate data, for software systems. These products are not using the traditional relational database (RDBMS) concepts and are built on different alternate technologies. Some of the technologies used are in-memory databases, Hadoop, No SQL, Virtualized or federated databases, Columnar databases, Streaming databases, and the like. It is true that traditional RDBMS might not be the proper fit for all data storage requirements, for example, it might not scale beyond a certain limit or it might not be the best solution for big data management or a text search that needs to be as fast as elastic search.

Nevertheless, most enterprise systems still use relational databases (RDBMS) for storing the data. There are a variety of reasons for this, some of them being the ease of use, the transactional ability (for example, atomicity, consistency, isolation, and durability "ACID"), the existence of developers and support that already have competence in the technology, data security, existence of a standard SQL interface which is interoperable between different database vendors, high data integrity, and/or performance with respect to some of the storage operations. The traditional RDBMS products are proven and time tested and have good development support from vendors. Also, there exist standard practices and procedures for different aspects of solution development, deployment and data management such as back-up, redundancy, fail-over, and the like.

The data that is stored in a typical database can be of different categories. There can be configuration data, which is the metadata required for the solution or system for its own functioning. The configuration data is typically less in terms of volume. There can also be transactional data, which is generated by the different products in the solution, while performing the actual business transactions. The transaction data generated by most of the systems will be huge, depending upon the kind of application. Any system that processes huge amounts of transactions, for example, financial systems, B2B systems, and the like, can create millions of data records every day. Transaction data, or any other data that is high in terms of volume of records, in a relational database, for example, can be difficult to process efficiently.

Though the entirety of the transaction data might not be actually required for the current or future transaction processing, data for a certain period conventionally will have to be retained for the following purposes:

1. There might be business reasons and functionalities that require old transaction data. For example, a functionality might be specified that customers should be able view the transactions for last one month.

2. There can be features, for example, resubmitting an old transaction, which require the transaction data.

3. There might be legal requirements to retain the data for a specific time period.

4. The data might be required for a specific time for reconciliation, billing, and the like 5. The data might be required for audits.

6. The historical data might be required for analysis, historical statistics and/or dashboards.

7. The data might be required for problem analysis of transactions, if there is a failure and/or error.

However, generating large volumes of data over a period of time has some consequences with respect to application performance and maintainability. A high volume of transaction data can impact the overall performance of the software system(s). A high volume of data can make some of the SQL queries slower; reduce the speed of inserts and other database operations; and decrease application throughput and overall performance. Once the data exceeds a certain size, the application response can fall below acceptable limits and can result in non-responsive screens or processes.

Also, very large volumes of data require large disk space. Furthermore, the data back-up and recovery processes will become tedious, time consuming and expensive. Every RDBMS also needs routine maintenance, for example, Statistics updates, Reorg to keep database performance intact, and others which will be appreciated by those of skill in the art. In order for some of the processes to be performed, application downtime is required.

Since the storing high volume of data in a transaction database has numerous issues including those mentioned above, the standard practice followed to address this problem is as follows.

i. Retain the data for only a small duration of time in database. The time duration will be decided based on the business requirements. Move the data that has passed this time duration to a different database. This process is referred to as archival of data.

ii. The original database where data is created by the application is referred to herein as a "transaction database" and the database to which the data will be moved as part of archival process will be referred to herein as an "archive database."

iii. The archive database can be used for storing the data required for historical analysis, dashboards, audit, legal requirements, etc.

iv. After a pre-configured time, the data can be permanently removed from archive database. This process will be referred to herein as "purging of data."

The above standard approach will make sure that the volume of transaction data is always below a controlled limit and the application performance will not be affected. Also, the purging process in archive database will ensure that overall data volume in the application will not exceed a specified limit.

Reference is now made to FIG. 1, illustrating a conventional archiving approach, performed in connection with a relational database. In FIG. 1, a transaction database 101 will be archived by an archive process 105 into an archive database 103. The transaction database includes files, here represented by files three files 107a, 107b, 107c, which contain data as transaction records. The data to be archived is distributed in these three files. The dashed line represents the data, i.e., selected records 109, which need to be archived. Some of the records in the transaction database are selected 115, and the selected records 109 are to be archived. The archive process 105 will copy the individual selected records 109 to the archive database 103, and the archived selected records 111 which includes individual transaction records from the three files 113a, 113b, 113c, are included in the archive database by having been individually copied there.

Though the standard approach to archiving and purging is common for all kinds of software solutions, no relational database currently has out of the box capability to archive and purge the data automatically. Consequently, as the archival process 105, application developers have to create a custom solution to archive and purge the data, for each individual software system that creates transaction data in a relational database. This solution will typically be constructed using Database scripts that will delete the data (as each individual record) from transaction database and insert the data (individually, by copying each individual record) to the archive database. The database scripts will purge the data from archive database as well.

An API based approach where a software system will use APIs (for example, JDBC APIs) to do the required data manipulation (which handles individual records and including copying thereof).

Use a third party solution that helps in archiving and purging, based on configuration. This might have dependency on specific database types.

All the above approaches also require a scheduler framework to execute the solution at regular intervals. Among other problems of the conventional approaches, there is also a requirement to monitor the execution of the solution to make sure there are no execution errors.

B. Archival Process

Figure 2:
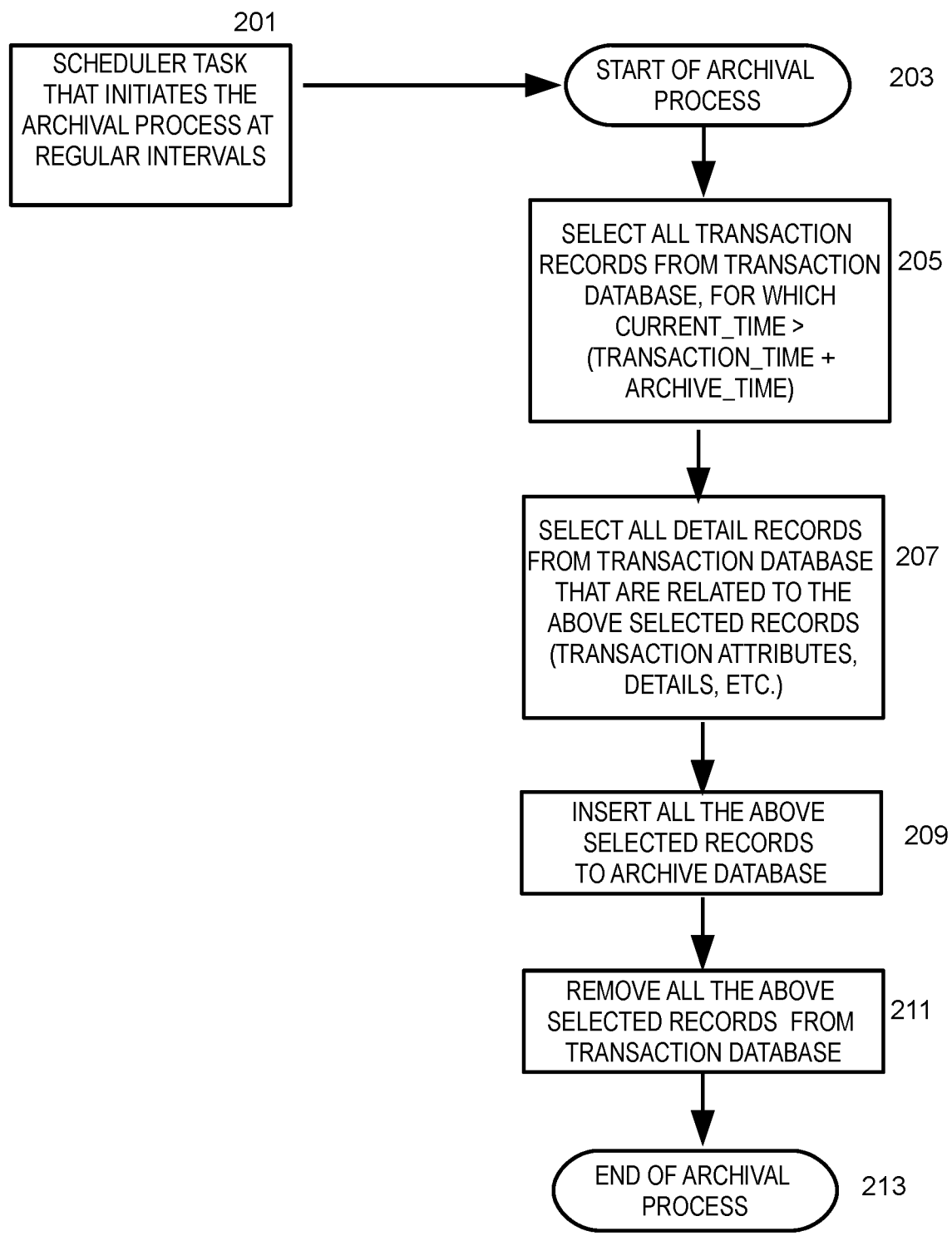
FIG. 2 is a diagram illustrating a conventional archival process.
Figure 3:
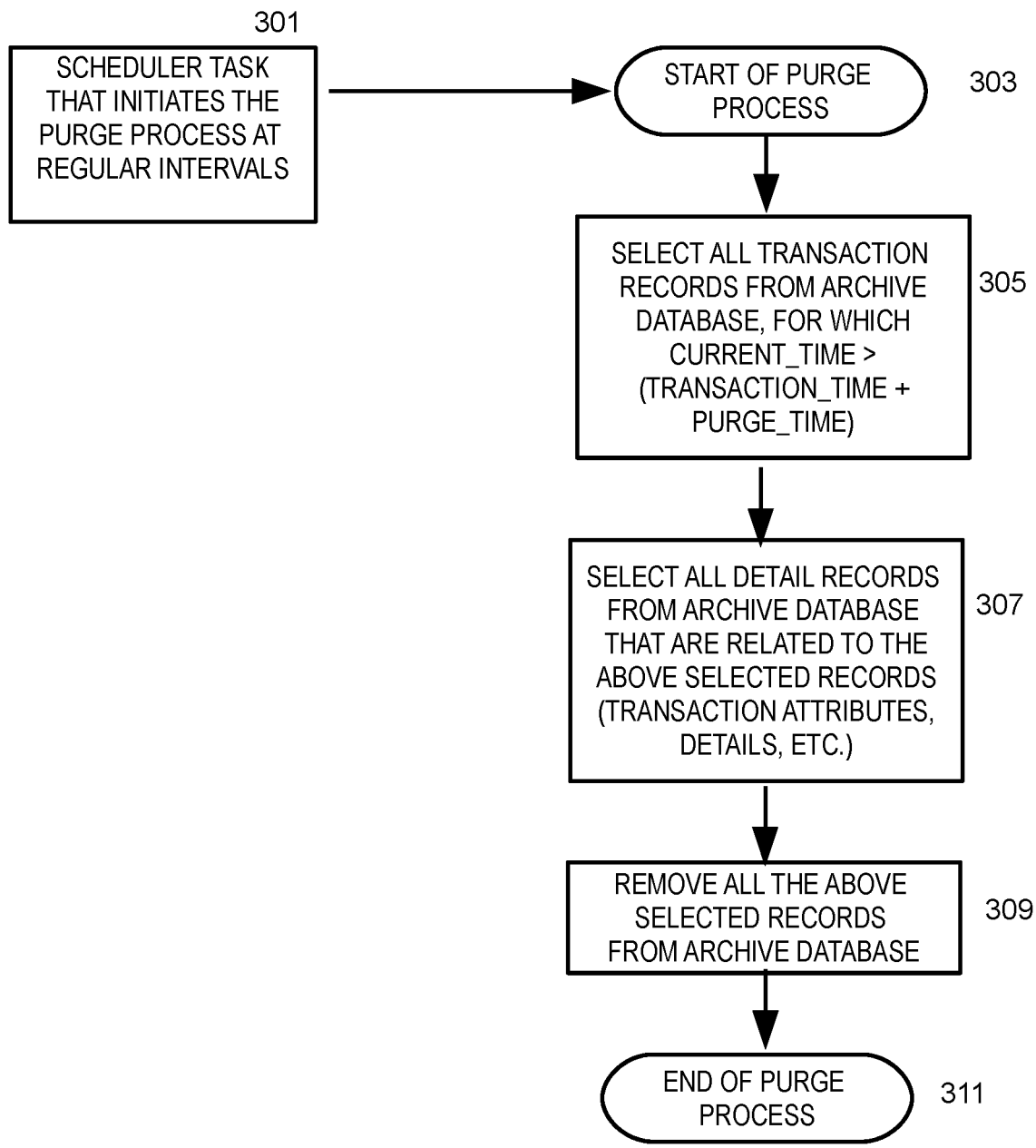
FIG. 3 is a diagram illustrating a conventional purge process.

A diagrammatic representation of the conventional solution is given below in connection with FIG. 2, which illustrates a conventional archival process, and FIG. 3, which illustrates a conventional purge process. In FIG. 2 and FIG. 3, the following terminologies are used:

CURRENT_TIME: The date and time at which the process is executed.

TRANSACTION_TIME: The data and time at which the original transaction record was created.

ARCHIVE_TIME: The time configured after which a transaction record should be moved from Transaction database to Archive database, for e.g. 15 days.

PURGE_TIME: The time configured after which a transaction record should be removed from Archive database, for e.g. 2 years.

FIG. 2 illustrates a conventional archival procedure. In FIG. 2, a scheduler task initiates 201 the archival process at regular intervals. The archival process 203 which is started will select 205 all transaction records from the transaction database, for which CURRENT_TIME>(TRANSACTION_TIME+ARCHIVE_TIME). Then, the archival process will select 207 all detail records from the transaction database that are related to the selected records (including, for example, transaction attributes, details, and the like). Then, the archival process will insert 209 all of the selected records selected at step 207 to the archive database, which includes individually inserting each selected record from the transaction database into the archive database. Then, the archival process will remove 211 all of the records selected at step 207 from the transaction database, which includes individually deleting each selected record from the transaction database. Then the archival process is ended 213.

C. Purge Process

FIG. 3 illustrates a conventional purge procedure. In FIG. 3, a scheduler task initiates 301 the purge process at regular intervals. The purge process 303 which is started will select 305 all transaction records from the archive database, for which CURRENT_TIME>(TRANSACTION_TIME+PURGE_TIME). Then, the purge process will select 307 all detail records from the archive database that are related to the selected records (including, for example, transaction attributes, details, and the like). Then, the purge process will remove 309 each of the records, individually, selected at step 307 from the archive database, which includes individually deleting each selected record from the archive database. Then the purge process is ended 311.

II. Problem Presentation

There are problems with the current approaches to archiving and purging a database. As mentioned, there is no existing feature in any relational databases to archive and purge the data automatically. To address this, each application developer will have to design and develop a custom solution that will archive and purge the data. This solution might use scripts that will do the required job or use a third party solution to achieve the same. This has disadvantages including the following:

1. Time taken for the execution of the archival process and/or the purge process can be too long and can be unacceptable in some cases. The script based or external approach for archiving and/or purging will have to interact with the database for pulling the data, removing the data from one schema or database and inserting into another. This will be time consuming. It is not uncommon to see archival or purge processes taking few hours or even days for each execution.

2. Since the solution has an external process that does the data extraction and insertion into other database schemas, each database operation will have to pass through all the validations, checks, and other complex processing in a database. For example, an insert operation in Oracle might require entries in redo logs, unique constraint checks, integrity checks, updating index entries, and creating the actual data records in storage files. Even if the data is moved between two schemas in the same database (or even different tables in the same schema), all these operations will have to be performed. So, clearly, the operations are not optimized, and furthermore this can affect the performance of both the transaction and archive database. The long execution time mentioned in the previous paragraph is mainly due to this reason. Due to this factor, typically organizations schedule or perform archive and purge tasks during off-peak time or application down time.

3. Since the archiving and purging process has to be run regularly or continuously, the process needs to be scheduled or configured to run at regular intervals. This might be every hour, every day, alternate days, and so forth, depending upon the volume of data and other factors. This necessitates solution developers to create a framework to schedule and run the process based on specific needs and also a way to monitor the execution. There should be continuous monitoring of the process execution as any failure in the execution can pile up large volumes of data and can further negatively impact system performance.

4. Since conventional techniques require a custom solution development, additional time and resource has to be allocated for developing the archive and purge feature. Also, the skill set required for developing the purge solution, for example expertise in database scripts, might not be available always. If a third party product is used for this purpose, developers will need to be conversant with that. In addition, the end customer will need to have additional licenses, above and beyond the database license, which are required to use the products relied on for the archive and purge feature which is developed.

5. Since the conventional technique is a custom solution developed by developers and not an out-of-the-box feature from a database vendor, this can have the typical issues or challenges for every custom solution—data correctness, data corruption, integrity issues, performance issues, and the like. Proper care has to be taken to address all these issues, since the solution deals with data removal, which is very critical. In a good number of cases, any accidental data corruption or deletion cannot be reversed and can result in a permanent damage.

As a result, there is significant room for improvement of archiving and purging solutions for databases.

III. Aspects of the Approach

A. Concept

The innovation disclosed herein suggests an approach where the database itself will be designed to archive and purge the data, without any external triggers. The database will take care of data cleanup automatically and there is no requirement for an external application to keep track of data maintenance. This innovation also discloses that the data management (archiving or purging) is handled inside the database and the data is not required to be extracted out of the database and inserted back to the database again, which was is a major root cause of some disadvantages of the existing archiving and purging solution. That is, by building on existing database functionality, it is unnecessary to copy individual transaction records from the transaction database and insert the individual transaction records to the archive database and then delete the individual transaction records from the transaction database. While creating a data structure, such as for the transaction database, the database administrator can specify the parameters or criteria required for control of automatic archival and/or purging of data.

The main approaches that are used in a typical database deployment for archiving or purging of data as per conventional techniques include:

i. Time based archiving or purging:

In the typical approach, the records in a database will be moved based on the time of insertion of data. Here, "move" means copying the individual transaction record and inserting the record to the archive database and then deleting the individual transaction record from the transaction database. The data that is inserted to the database will be archived and/or purged after a pre-configured period of time.

For example, a customer might have a TRANSACTION table, which will have one entry per business transaction, in a transaction database. In this example, customers would need to retain each entry of the transaction data for 30 days (approximately one month), so that at any given point in time, the production database will have a data for the last 30 days. The data older than 30 days will have to be moved to an archival database, by copying individual transaction records and inserting the records to the archive database and then deleting the individual transaction records from the transaction database.

Instead of basing the move to the archival database on the time of insertion of data, another date or timestamp column can also be used for this approach, for example, expiry date or submission date.

ii. Archiving or purging based on referential constraints:

This approach can be used in conjunction with time based archiving and/or purging. Typically, transaction data will have reference data in the database. The reference data can be data that has details of the transaction or attributes of the transaction or dependent data in any other way, as is understood by one of skill in the art. When a transaction data is removed, the referenced records for the data should also be removed, meaning that the individual transaction record is being deleted.

The conventional custom, which was discussed earlier, created for archiving or purging, periodically monitors this data and selects the individual data records to be deleted for the archive or purge operation.

By comparison, the novel concept disclosed herein may require the creation of database table(s) to specify the parameters to archive and purge the data, during table design itself, that is, the design of the table storing the transaction data. There can be a table specific configuration, for example, the approach to be used for purging or archiving the data for that specific table, and/or as global configuration, for example the details of archiving schema for all tables in a current schema. The global configuration can be customized for specific database tables. The details of the configuration are mentioned in the section titled "IV. Detailed Application of Approach".

This solution disclosed herein can address the disadvantages with the traditional approach, by creating a custom solution, which is mentioned in the section titled "II. Problem Presentation". Some of the benefits of the innovation are listed below:

(1) The time taken for the archive and purge of data can be significantly reduced from a few hours (required for the conventional technique) to a few milliseconds or even less, since the database itself is handling the movement of data. The data (individual records) need not be moved (copied) out of the database and inserted (copied) back to the database as in the case of traditional approach and this addresses the major disadvantage of the existing traditional approach.

(2) Since the operations happen inside the database, namely, as an implementation detail of the database itself, which is handled internally by the database, the solution disclosed herein can by-pass most of the expensive internal validations and/or checks, which are done for a data from an external source. This improves the efficiency of the operation and improves the time of execution (the point mentioned above).

(3) The solution disclosed herein will avoid the additional complexities of creating a solution and save time and effort for solution developers. Moreover, no additional competency is required, since the solution disclosed herein is done in a database and is not a solution to be created by developers.

(4) Furthermore, the solution disclosed herein has no external scheduling logic, and does not require monitoring in deployment.

(5) Since the solution disclosed herein is internal to a database, it will take care of data corruption and integrity issues by reliance on the database itself.

IV. Detailed Application of Approach

The concept can be implemented using different approaches or designs. The following design uses an extension of a feature, namely a database partition, which is supported by at least major databases and/or database management systems (DBMS) such as ORACLE database, MS SQL database, DB2 database, and many others, and variations and extensions thereof. Implementation details and design of a specific solution are discussed in the section titled "IV. B. Design and Implementation."

Also, there can be different ways to specify the parameters or criteria required for archiving or purging of data. One possible way of specifying the parameters for database archive and purge is mentioned in the section titled "IV. A Configuring Data Archival or Purge."

A. Configuring Data Archival or Purge

This section has details of a proposed configuration for archival and purging of data, in a database. The "Table Level Parameters" section below discusses table level configuration, and the parameters that are to be configured for each table that needs to be archived or purged.

The "Global Configuration" section below discusses details on parameters that can be configured globally (at schema level) and still can be customized at table level.

The section demonstrates creating few tables for storing transaction data and detail data that references transaction data, and specifies the archive configuration for those tables. Aspects of the proposed new configuration relate to Step 3 and Step 7 below; steps 1, 2, and 4-6 are table creation steps which can be followed in a typical database script according to known techniques. Standard SQL data definition language syntax is used to demonstrate the configuration.

An analogous approach can be used for database purge configuration as well.

Table Level Parameters

1. Create the main table

```
CREATE TABLE TRANSACTION (
    TxnID             CHAR(24) NOT NULL,
    TransactionDate              TIMESTAMP,
    Other Columns...
)
```

2. Specify the primary key column for the table

```
ALTER TABLE TRANSACTION
    ADD CONSTRAINT PK_TXN PRIMARY KEY(TxnID);
```

3. Novel SQL to specify the archival parameters, based on time based approach: Column based on which archival should be done and the time after which the data should be archived.

```
ALTER TABLE TRANSACTION
    CONFIGURE ARCHIVE TIME (TransactionDate, 30D);
```

This indicates that the data of the table should be archived based on the value of the column TransactionDate and the archive time period is 30 days. The keyword TIME indicates that this is a time based archiving.

4. Create the dependent referenced tables

```
CREATE TABLE TRANSACTION_DETAILS (
    TxnDetailID    CHAR(24) NOT NULL,
    TxnID          CHAR(24) NOT NULL,
    Other Columns...
);
```

5. Specify the primary key column for the referenced table

```
ALTER TABLE TRANSACTION_DETAILS
    ADD CONSTRAINT PK_TXN_DTLS PRIMARY KEY
    (TxnDetailID);
```

6. Add the foreign key constraint, which indicates the relationship between transaction table and the dependent reference table (TRANSACTION_DETAILS).

```
ALTER TABLE TRANSACTION_DETAILS
    ADD CONSTRAINT FK_TXN_DTLS FOREIGN KEY (TxnID)
    REFERENCES TRANSACTION;
```

7. Novel SQL to specify the archival parameters, based on reference approach: Specify the foreign key reference based on which the data in this table has to be archived

```
ALTER TABLE TRANSACTION_DETAILS
    CONFIGURE ARCHIVE REFERENCE (FK_TXN_DTLS);
```

This indicates that the data of the table should be archived based on the reference relationship between this table (TRANSACTION_DETAILS) and TRANSACTION. The data in this table will be archived automatically, when the parent record (or related record) in TRANSACTION table is archived.

Global Configuration

The following are parameters, which can be configured globally (that is, at a schema level) for database archive and purging. However, these parameters can be customized or changed at table levels as well.

Schema details for archiving: The details of the schema where the data needs to be archived to. This will contain archive tables that have the exact structure of the transaction tables. Also, refer to the "Extensions" section below.

Default archival time period: Default period to perform periodic data archival of tables. This can be pre-defined as, for example 30 days or 3 months, or other numbers of other time periods. This is applicable if no time period is specified at table level.

Default purge time period: Default period to do purge data from tables. This can be pre-defined as, for example, 6 months or 2 years, or other numbers of other time periods. This is applicable if no time period is specified at table level.

Extensions

The following are some of the extensions to the approach mentioned above:

(1) New database column types for purge or archive: above we discuss using the database columns of type TIMESTAMP or DATE for archiving or purging. An extension to this can be a new column type, for example, ARCHIVE_DATE. If this is used as the column type while defining a table column, the table data can be automatically archived based on global settings.

(2) Automatic creation of archive tables or schema: There can be a feature in a database where the tables required for archiving a transaction table can be automatically created, based on the archive parameters being pre-defined in a transaction table. There can be provided a capability where the archive schema itself is automatically created.

B. Design & Implementation

The approach herein implements the concept using a feature of "Database Partitioning" which is a standard capability available in databases like Oracle, MS SQL, and the like.

Database partitioning is an available technique that allows a table that contains a large volume of data to be subdivided into smaller pieces, each of which is called a partition. As is known, when a large table is partitioned, the data inside the table is stored in different partitions, and this leads to better performance, manageability, and availability of a wide variety of applications. The queries that access only a partition can run faster because there is less data to scan.

Figure 4:
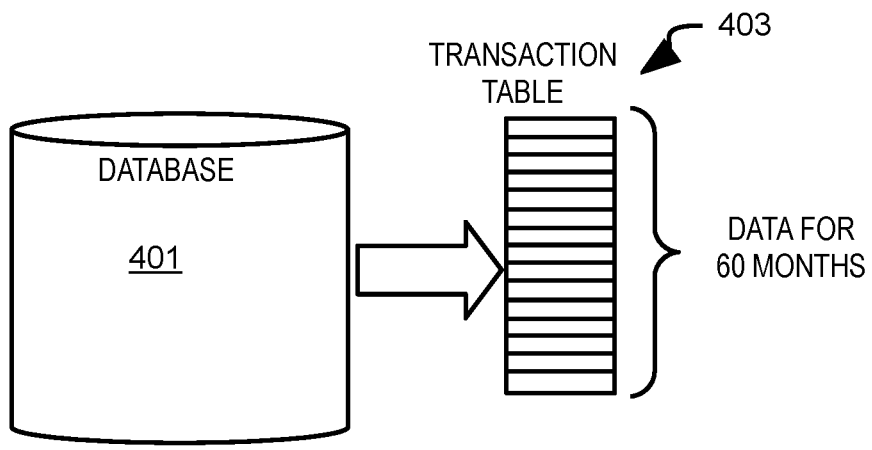
FIG. 4 is a diagram illustrating a non-partitioned table.
Figure 5:
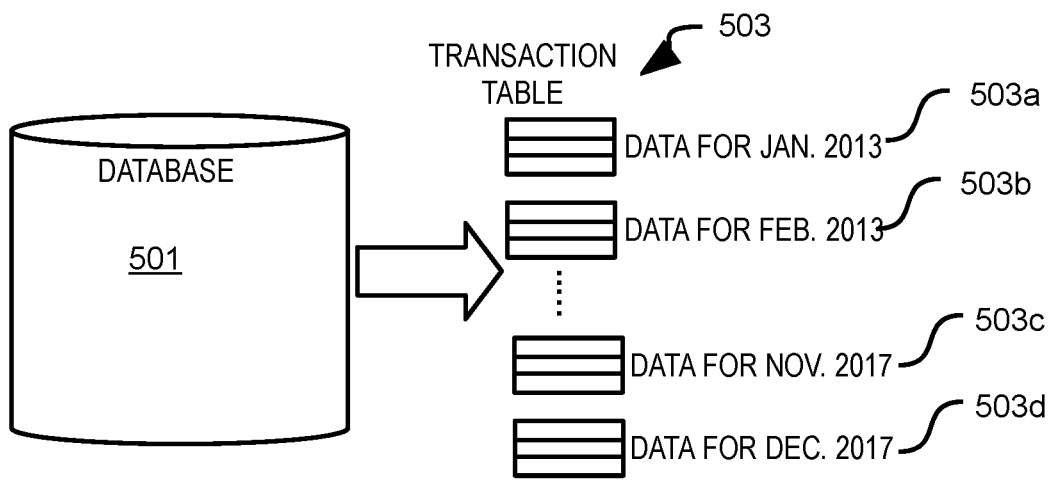
FIG. 5 is a diagram illustrating a partitioned table.

Different databases provide a variety of proprietary partitioning strategies like range partition, interval partition, composite partitioning, and others. FIG. 4 and FIG. 5 shows the difference for storing data, between a table which is not partitioned (FIG. 4) and a table with partition being enabled (FIG. 5).

Non-Partitioned Table:

All the data and indexes for the table is stored in the same partition. A query will run through the entire data. A database operation or purge or archival process will have to select the data from the entire date set and delete and reorganize the whole data store (or repository).

FIG. 4 is a diagram illustrating a database 401 with a non-partitioned transaction table 403. In the illustrated example, the transaction table 403 stores individual transaction records covering 60 months. Even if user sets the database to use all non-partitioned tables, the approach disclosed herein allows the database to internally use the partition function. A non-partitioned table such as illustrated in FIG. 4 can be self-archived as discussed herein.

Partitioned Table:

The data and indexes for the table are stored in different partitions, based on how the partition is defined. A database operation, for e.g. a query, will have to access only the required partition that has the relevant data.

FIG. 5 is a diagram illustrating a database 501 with a partitioned transaction table 503. In the illustrated example, the transaction table 503 stores data which is partitioned according to pre-defined parameters so that each partition encompasses data for one time period, here one month. Thus, the partitioned transaction table has a partition 503a with data (transaction records) for January 2013, a partition 503b with data (transaction records) for February 2013, and so on through a partition 503d with data (transaction records) for December 2017. Partitions may be added to the transaction table 503 on a periodic basis, or alternatively, the transaction records in the transaction table 503 can be partitioned into partitions periodically or as desired. Generically, a partition functionality is provided with many available databases, though it has never exploited for automated archive and purging functionality.

Figure 6:
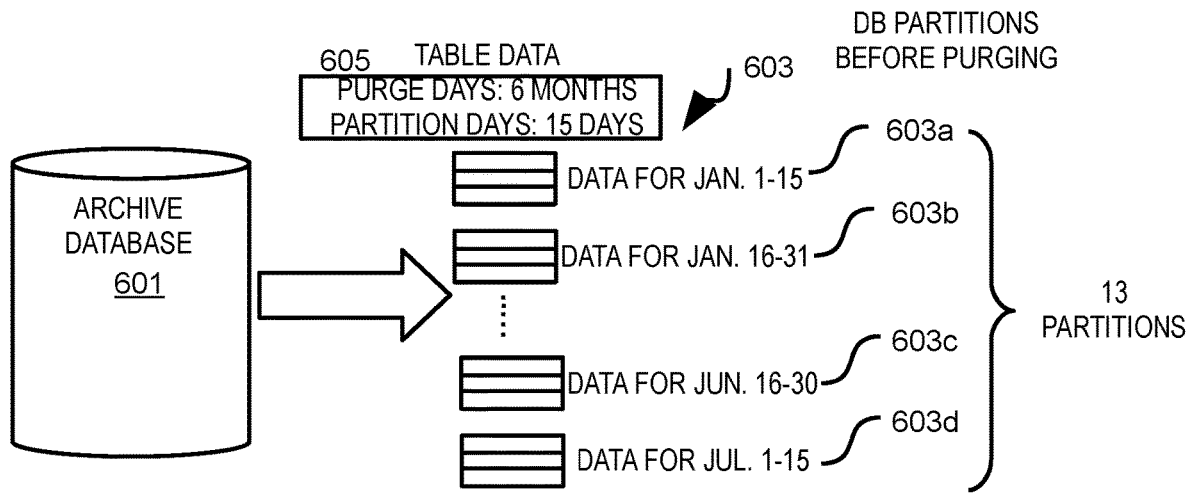
FIG. 6 is a diagram illustrating database partitions before purging a self-archiving database.
Figure 7:
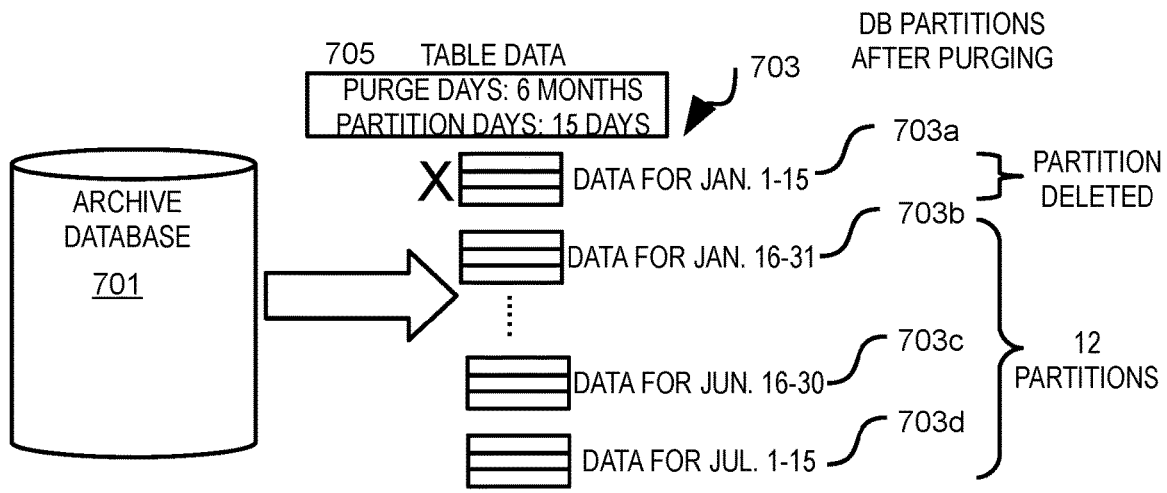
FIG. 7 is a diagram illustrating database partitions after purging a self-archiving database.
Figure 8:
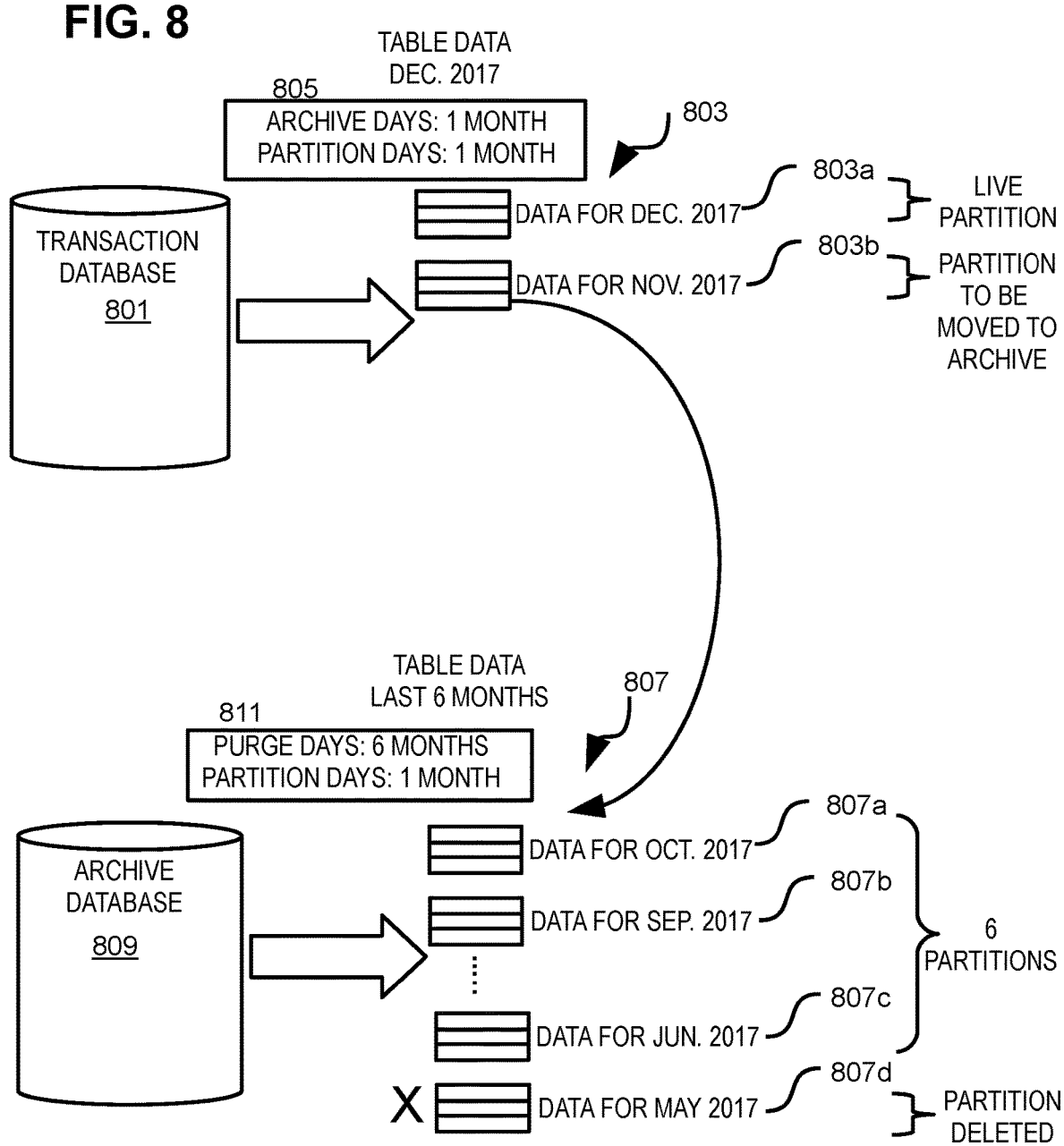
FIG. 8 is a diagram illustrating database partitions for a self-archiving database.

The solution disclosed herein newly exploits the generic partitioned table functionality to support a novel self-archiving approach to the archival and purge process. This is explained in detail below separately for the archive process and the purge process. The purge process is discussed first, in connection with FIG. 6 and FIG. 7 illustrating database partitions before and after purging a self-archiving database, respectively. The archive process is then discussed, in connection with FIG. 8 illustrating database partitions in a transaction database and an archiving database, for a self-archiving database.

1. Implementation—Data Purging

In the proposed self-archiving database, when a table is created that will require data purging, the data (transaction records) will be stored in partitions. The database will automatically create the partitions based on the purge configuration. In some embodiments, the table creator can define one or more of the configurations provided in the table, for example partition range and/or interval and/or periodicity parameters, to optimize the data storage and database operations.

The database can automatically decide the number of days of data to be stored in each partition. In the conventional partition feature, the database administrator specify the number of days of a partition. In the proposed solution, the database can automatically decide this based on the inputs provided by the user for purging, while creating database table. The data in a partition will be deleted as a whole when the partition is removed (that is, the data is deleted because the partition is deleted; when a partition is deleted, the underlying storage mechanism that indicates the files that hold the actual data is removed permanently, which in turn removes the individual transaction records without individually handling each transaction record). In this way, the number of days will also be a grace period for purging, since this is the maximum period a data record can be stored, once it exceeds the purge period. This is explained in detail in the demonstration below.

As mentioned earlier, when a partition is deleted, all the data in the partition will also be deleted. Generally, the deletion of data in a partition when that partition is deleted is an existing feature in almost all standard relational databases, though not in use for archival and purging; this is a proof that the proposed implementation is technically feasible and provides good improvement over traditional techniques for purging. The additional capability that is required from the database for this concept is that the database will have to perform purging automatically by keeping track of partition expiry, for example periodically once in a day or so, whereas the current conventional technique needs a manual triggering.

An example demonstration of the implementation is given below, in connection with FIG. 6 (partitions before purging) and FIG. 7 (partitions after purging). In FIG. 6, before purging, an archive database 601 stores an archive table 605 that contains partitioned data 603 which is pre-defined as having a purge days to cover 6 months, and partition days to cover 15 days. These time periods are merely illustrative of a variety of different time periods which may be implemented. In this example, the partitioned table includes 13 partitions 603a-603d, each covering one-half month: January 1-15 603a, January 16-31 603b . . . June 16-30 603c, and July 1-15 603d.

In this case, an archive table 605 is created in the database where user specifies that the partitioned data 603 should be purged after 6 months (purge days). In the example of FIG. 6, the database creates two partitions for every month (approximately 15 days of archived data will be stored in each partition). The value for the partition days can be automatically pre-determined by database based on certain logic, or the partition days can be configured by user. In this example, when the archived data reaches 6 months, 12 partitions would have been created in the partitioned data 603 by the database. Creation of the 13$^{th}$ partition 603d may be triggered when archived data exceeds 6 months. However, when the 13$^{th}$ partition 603d is completed, that is, yet another partition needs to be created, the database will remove the oldest partition, which is the 1$^{st}$ partition 603a, such as before creating another new partition, that is, a 14$^{th}$ partition. Here, the maximum days that the data can reside in the database will be the purge period (for example, 6 months)+the number of days in a partition (for example, 15 days).

In FIG. 7, after purging, an archive database 701 stores an archive table 705 which contains the partitioned table data 703 (as described above in connection with FIG. 6). In the example of FIG. 7, as explained above, the partition n with data for January 1-15 703a has been deleted, thereby leaving the partitioned table 703 with 12 partitions 703b-703d, each covering one-half month: January 16-31 703b . . . June 16-30 703c, and July 1-15 703d.

An approach to pre-determining by the database is where the purge period is x times that of a partition period (or in other words, partition period will be a specific percentage or proportional period of the purge period.) For example, if this factor is 5 times, and if the purge period configured by the user is 30 days (or one month), the database will automatically calculate the partition period as 6 days, which is 1/5$^{th}$ of 30 days.

As mentioned in earlier discussions, purge will be typically done in an archive database, where a user wants to remove the archived data after a predefined time period. In an embodiment, purge may be done in a transaction database, such as when the archive data is not required by an application or customer.

2. Implementation—Archive Process

An analogous approach is used for automatic archival of the data as well. Here also, the data will be stored as partitions based on customer configuration. All the configurations and extensions that were discussed for data archive, are applicable here as well.

The major difference of the archive process, as compared to a purge, is that for archiving, when the archive period is reached for a database record, the partition will be pointed to the archive database, instead of deleting the partition as happens in a purge. This way, the data in the partition will not be deleted, instead the partition is moved (without separately copying the individual records) to the archive database due to the partition being pointed to the archive database.

An example illustration of this implementation is provided in FIG. 8. In this example, the transaction database is configured to have 1 month of data, after which the data will be moved to the archive database. In the archive database of this example, the data will be required to be stored for 6 months and thereafter purged. In both the transaction database and the archive database, in this example the partition duration is 1 month, which means that the data can reside in the corresponding database for an additional 1 month maximum. It is not necessary for the partition duration to be the same for the transaction database and the archive database.

In FIG. 8, the transaction database 801 is configured by a pre-defined archive table 805 to have 1 month data, and the partition is pre-defined as storing one month of data (although the archive period and the partition period need not be the same). The transaction table data 803 is partitioned into partitions 803a, 803b each covering one month. Transaction data for current transactions is stored, as is conventional, into the partitions 803. When every new partition is created, the transaction database will inspect whether any of the old partitions 803b can be moved to archive database, so that the transaction data volume in the transaction database 801 can remain under a configured limit. In the example of FIG. 8, one partition is required for storing the data for one month based on the archive table 805. When a time period (a pre-defined partition days of one month) is reached for creating a third partition, the transaction database will move the oldest partition (in January 2017, the oldest partition is November 2017), but not the next oldest partition (which is December 2017 803*a*) to an archive database 809, since the next oldest partition 803*b* holds the data for one month, and the archive table 805 specifies one month as the configured period for which data is to be retained in transaction database. The partition December 2017 803*a* and the new partition to be created January 2017 (not illustrated) will be the current live partitions in the transaction data table 805. In the illustrated example, the Current Date=1 Jan. 2018. On Jan. 1, 2018, a new partition will be created for January 2018 (not illustrated) and the partition November 2017 803*b* will be moved to the archive database 809.

Also illustrated in FIG. 8 is the archive database 809 having an archive table 807 (which optionally can be implemented in a same data structure as archive table 805) pre-defining purge days as 6 months and partition size as 1 month. Data 811 in the archive table 807 in the archive database 809 is partitioned into one month periods, to include a partition with data for October 2017, a partition with data for September 2017, ... a partition with data for June 2017, and a partition with data for May 2017 807*a*, 807*b*, 807*c*, 807*d*. The most recent six partitions 807*a*, 807*b*, ... 807*c* are retained in the archive table 807. The partition which exceeds the pre-defined purge days of 6 months, i.e., the seventh partition (which is the oldest partition) 807*d* will be removed when a seventh partition, e.g., data for November 2017 803*b*, is moved to the archive. Accordingly, in the archive database, once the pre-configured purge time is exceeded, the most aged partition will be removed, and the conventional removal of a partition will clean up all the data in that partition.

The approach proposed above can be used to implement the concept in this innovation. Since the partition approach as a general feature already exists and since currently most of the databases have the capability to remove partitions, the approach is technically feasibly with minimum additions. Deleting a partition using the generally available feature can be done in few milliseconds or seconds whereas deleting the records in a traditional database script approach will take a few hours for a typical huge database. The implementation approach proposed can address all of the disadvantages mentioned in the section titled "II. Problem Presentation" and can have all of the benefits mentioned in the section III. A. Concept."

V. Additional Example Implementation(s)

Figure 9:
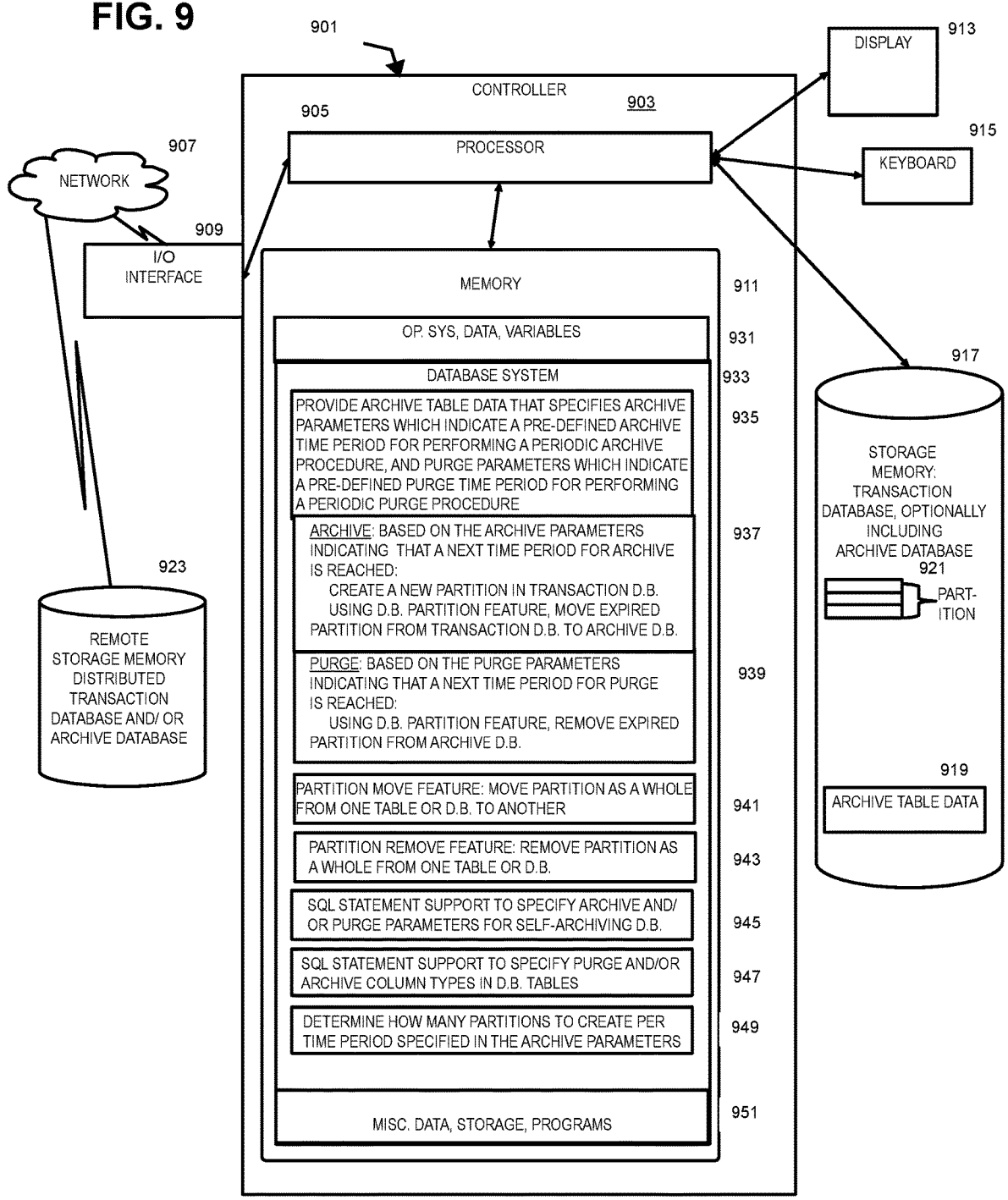
FIG. 9 is a block diagram illustrating portions of a database system.
Figure 10:
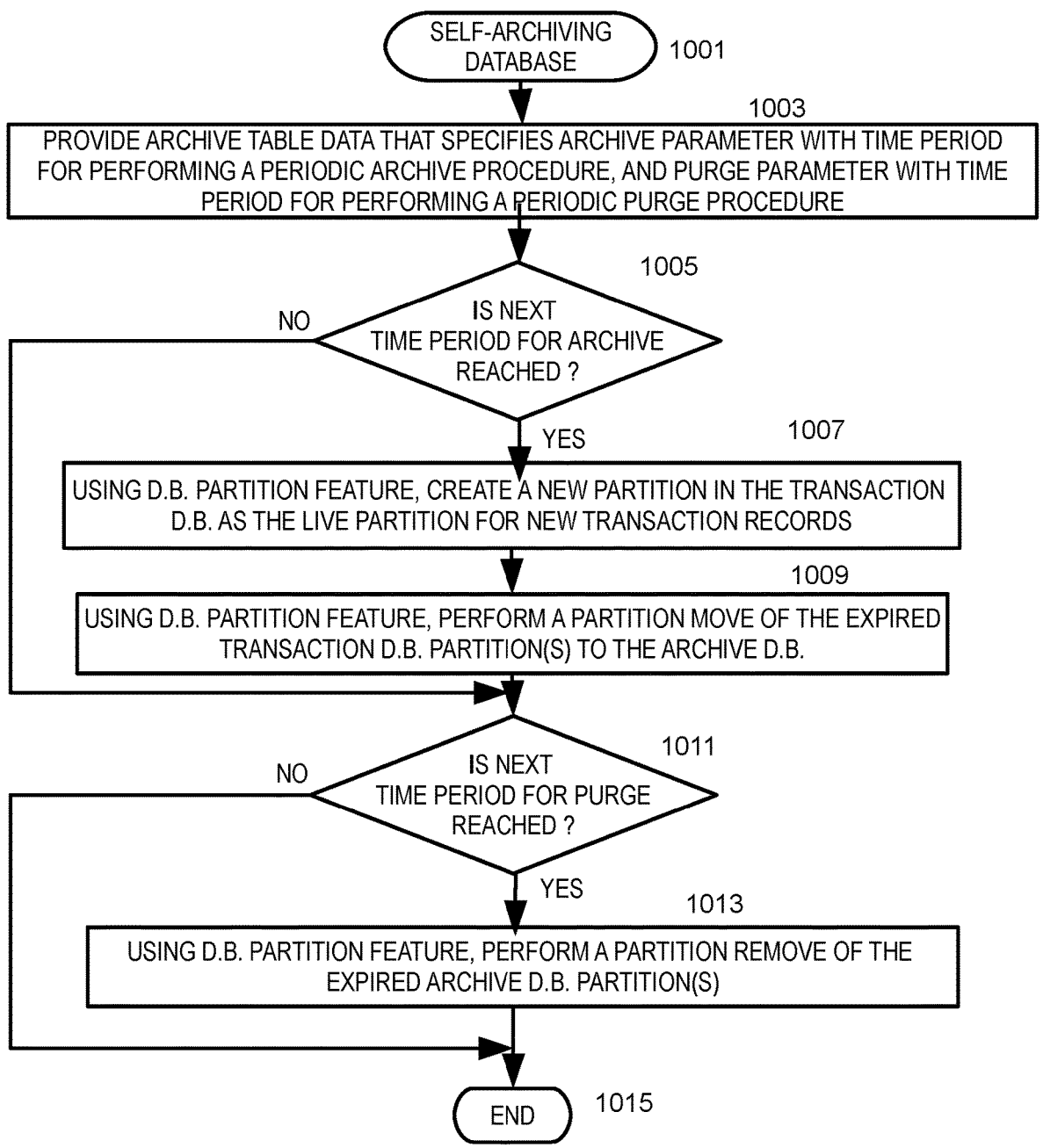
FIG. 10 is a flow chart illustrating a self-archiving database procedure.

This section will discuss additional concrete examples of implementations. FIG. 9 is a block diagram illustrating portions of a database system with a self-archiving database. FIG. 10 is a flow chart illustrating a self-archiving database procedure.

FIG. 9 is a block diagram of an exemplary computer in a database system used in operation of one or more embodiments. The computer 901 may include a processor 905, a memory 911, and other peripherals or features such as an I/O interface 909 for communication with over a network 907, a display 913, and/or a user input device such as represented here by a keyboard 915.

The processor 905 may comprise one or more microprocessors and/or one or more digital signal processors. The memory 911 may be coupled to the processor 905 and may comprise a read-only memory (ROM), a random-access memory (RAM), a programmable ROM (PROM), and/or an electrically erasable read-only memory (EEPROM). The memory 911 may include multiple memory locations for storing, among other things, an operating system, data and variables 931 for programs executed by the processor 905; and computer programs for causing the processor to operate in connection with various functions such as a database system 933. The computer programs may be stored, for example, in ROM or PROM and may direct the processor 905 in controlling the operation of the computer 901.

The user may invoke functions accessible through the user input device 915. The user input device 915 may comprise one or more of various known input devices, such as a keypad, a computer mouse, a touchpad, a touch screen, a trackball, and/or a keyboard. Responsive to signaling from the user input device 915, in accordance with instructions stored in memory 911, or automatically upon receipt of certain information via the I/O interface 909, the processor 905 may direct the stored information or received information. The display 913 may present information to the user by way of a conventional liquid crystal display (LCD) or other visual display, and/or by way of a conventional audible device (e.g., a speaker, not illustrated) for playing out audible messages. Portions of the computer 901 are well understood to those of skill in this area and have been omitted to avoid obscuring the discussion.

The database system 933 may include the following feature; portions of the database system 933 are well understood to those of skill in this field and are omitted to avoid obscuring this discussion. The database system 933 may be programmed to include a feature that provides archive table data for archive parameters and purge parameters 935. The database system 933 may be programmed to include an archive feature using partitions 937. The database system 933 may be programmed to include a purge feature using partitions 939. Also, the database system 933 may be programmed to include a partition move feature 941, and a partition remove feature 943, which will be understood by one of skill in the art to be a standard feature provided by a database system, as further discussed herein. The database system 933 may be programmed to support a SQL statement to specify archive and/or purge parameters 943. The database system 933 may be programmed to support a SQL statement to specify purge and/or archive column types in database tables. The database system 933 may be programmed to determine how many partitions to create per time period specified in the archive parameters 949. Each of these functions is considered in more detail below, to the extent that it is not detailed elsewhere in this document.

Also, the database system may include a storage memory 917 into which the database is stored, according to known techniques. As illustrated in FIG. 9, the storage memory 917 stores therein a transaction database, which is a relational database, which stores transaction records, and an archive database into which older transaction records are stored. The storage memory 917 also includes the archive table data 919, which provides parameters that configure that database system to automatically without manual intervention perform archives and purges of the transaction database, and which specifies a desired configuration for the archives and purges. The archive database and the transaction database may be provided on separate storage, or on a same storage, as illustrated in FIG. 9.

The database system 933 may be programmed to include a feature that provides archive table data for archive parameters and purge parameters 935. In particular, the database system can provide archive table data that specifies archive parameters which indicate a pre-defined archive time period for performing a periodic archive procedure, and purge parameters which indicate a pre-defined purge time period for performing a periodic purge. In examples discussed above, the purge parameters indicate that purge days are six months (meaning that a minimum period covered by the archive database is at least six months), and the purge parameters also indicate the size of a partition in the archive database, e.g., one month, or 15 days. In examples discussed above, the archive parameters indicate that the archive days are one month (meaning that a minimum period covered by the transaction database is at least one month), and the archive parameters also can indicate the size of a partition in the transaction database, for example, one month. If the archive days (period for archive) for the transaction database is, e.g., one month, then the transaction database will have a partition(s) with past transaction records for one month, plus the transaction records being added to a live partition, such that the transaction database always has a live partition plus partition(s) of past transaction records to cover the archive time period. If the purge time period is six months, then the archive database will have partition(s) with archived transaction records to cover at least the purge time period. This has also been discussed above in detail.

The database system 933 may be programmed to include an archive feature using partitions 937. For example, based on the archive parameters indicating that a next time period for archive is reached, the database system can create a new partition in the transaction database, using a standard database partition creation feature; and can move an expired partition from the transaction database to the archive database using a standard database partition move feature. The expired partition can be determined based on the archive parameters and the information in the transaction records in the partitions. Transaction records thereafter will be added to the new partition. The expired partition is available in the archive database. The partition is moved as a whole by the database system without handling each individual record.

Also, the database system 933 may be programmed to include a purge feature using partitions 939. Based on the purge parameters indicating that a next time period for purge is reached, the database system can move the expired partition from the archive database using a standard database partition remove feature. A removed partition is no longer available to the database system.

Also, the database system 933 may be programmed to include a partition move feature 941, and a partition remove feature 943, and a partition create feature (not illustrated) which will be understood by one of skill in the art to be standard features provided by a database system, as further discussed herein. Database systems are known to provide statements that cause a database system to perform such partition features.

Also illustrated in the storage memory 917 is a representative partition 921. A brief discussion of a lifecycle from the viewpoint of this one representative partition 921 is provided for better understanding. Based on the present disclosure, it will be appreciated that the representative partition 921 is created as a new partition in the transaction database based on the archive table data 919 indicating that it is time for an archive (discussed much above). The representative partition 921 starts out as a live partition, and transaction records are stored (with the usual techniques) into the representative partition 921 as they are created. After a pre-defined period, the archive parameters in the archive table data 919 indicate that a next time period (for example, one month) for the archive is reached, and the representative partition 921 is supplanted by a new partition which is created for the transaction database; meanwhile the representative partition 921 remains in the transaction database so that at least the past, e.g., one month of transaction data remains conveniently available for historical searches, and so on. After yet another pre-defined period specified in the archive parameters, the representative partition 921 is moved to the archive database using a partition move feature; the transaction records within the partition 921 are not copied and moved or inserted, but merely the representative partition 921 is assigned as a whole to a different database (the archive database) thereby avoiding overhead of copying, moving, confirming, and otherwise properly handling individual transaction records and data. After the pre-defined purge period is reached (for example, six months), the representative partition 921 becomes sufficiently old that it expires, and the representative partition 921 is removed as a whole from the archive database by a partition remove feature, which means that the representative partition is freed-up and thereby space for the transaction records in the representative partition 921 is available to be re-written or similar without handling each individual transaction record and data in the partition 921.

The database system 933 may be programmed to support a SQL statement to specify archive and/or purge parameters 943. The database system 933 may be programmed to support a SQL statement to specify purge and/or archive column types in database tables. These SQL statements are new to SQL and can provide a new column in a transaction table which is used, in connection with the archive or purge time period, to trigger an archive or purge, respectively.

The database system 933 may be programmed to determine how many partitions to create per time period specified in the archive parameters 949. This has been explained above.

As will be understood in this field, besides the functions discussed above, the memory 911 can include other miscellaneous information in a miscellaneous storage 951 along with the usual temporary storage and other instructions for other programs not considered herein.

The computer 901 can accommodate one or more disk drives or removable storage (not illustrated). Typically, these might be one or more of the following: a flash memory, a hard disk drive, a CD ROM, a digital video disk, an optical disk, and/or a removable storage device such as a USB memory stick, variations and evolutions thereof. The number and type of drives and removable storage may vary with different configurations. Disk drives may be interconnected by a bus along with other peripheral devices supported by the bus structure (not illustrated); a disk controller (not illustrated) can interface disk drives to the bus and to the processor 905; disk drives may be internal or external. One or more of the processor 905, memory 911, and optionally a disk drive and/or removable storage medium provide non-transitory storage of computer programs and data.

It should be understood that FIG. 9 is described in connection with logical groupings of functions or resources. One or more of these logical groupings may be performed by different components from one or more embodiments. Likewise, functions may be grouped differently, combined, or augmented without parting from the scope. Similarly, the present description may describe various databases or collections of data and information. One or more groupings of the data or information may be omitted, distributed, combined, or augmented, or provided locally and/or remotely without departing from the scope.

FIG. 10 provides an illustration of a self-archiving database procedure 1001. Most of the details implicated by FIG.

10 have been discussed above and are not repeated herein. However, FIG. 10 may be useful to illustrate the procedure and to provide a more complete understanding. The procedure can advantageously be implemented on, for example, a processor of a controller, described in connection with FIG. 9 or other apparatus appropriately arranged.

By way of overview, the procedure 1001 for a self-archiving database can provide 1003 archive table data that specifies an archive parameter and a purge parameter. The procedure can determine 1005 whether the next time period for archive is reached; and the procedure can perform an archive using database partition features 1007, 1009. The procedure can determine 1011 whether the next time period for a purge is reached; and the procedure can perform a purge using a database partition feature 1013. The self-archiving database procedure can then end 1015. The self-archiving database procedure 1001 can be self-triggered triggered on a pre-determined periodic by the database itself, for example, without limitation, once every few minutes or hours, or days, or once a year. In some cases, existing archiving approaches can be adapted to create new partitions. The self-archiving database procedure 1001 therefore can provide a continuously self-executing procedure which uses a database-provided feature—of partitions—which is exploited to create room for new transaction records in a new partition, to assign transaction records as part of the partition to a database (transaction database or archive database), and to delete transaction records as a whole as part of the partition; since the partition features are already part of a database system, the database system itself already handles consistency, error checking, any verification, and the like.

VI. Glossary

Terms as used herein are intended to be interpreted first, as understood to one of skill in the art at a first level, of databases and archiving thereof; and if not interpretable at the first level, then at a second level as understood to one of skill in the art of computer science; and then if not interpretable according to the first level and second level, according to a more general dictionary.

The claims may use the following terms, which are defined to have the following meanings for the purpose of the claims herein. Other definitions may be specified in this document.

The term "configuration data" is data that is required to set up the system or application, including, for example, product settings, asset configuration, and the like; configuration data is typically set up once and optionally can be modified later. Configuration data is sometimes referred to as "metadata". A volume of configuration data is less than a volume of transaction data.

The term "transaction data" is data that is generated by the business transactions that happen in the system, where each business transaction can generate transaction data; the transaction data for one transaction contains information of the transaction, such as is generated by or input to the transaction. A volume of transaction data will be large since a typical enterprise system performs a large number of transactions every day. In operation, transaction data is a client's data that a database stores, which can be later retrieved, modified, and deleted by further client calls.

The term "database" referred to herein is a relational database (RDBMS), which is used in a software system to store relational and transaction data. Examples of relational database include, by way of illustration, but without intending to be comprehensive, Oracle database, MS SQL database, IBM DB2 database, MySQL database, and the like.

The term "transaction data records" or "transaction records" as used herein refer to the data that a client is storing in a database.

The noun "record" as used herein refers to the storage organization form of RDBMS. Conventional archiving is performed on a record level.

The term "partitioning" or "partition" as used herein, and the related term "partitioned" table, refer to techniques known to one of skill in the art as "Partitioning" that allows relational database objects such as tables, indexes, etc. to be subdivided into smaller pieces, enabling these database objects to be managed and accessed at a finer level of granularity; by splitting a larger table into smaller tables, queries will access a fraction of the data and will run faster. Database partitioning is normally done for manageability, performance or availability reasons. "Partitioning" is supported by most of the industry standard relational databases like Oracle database which have a built-in partitioning feature, in which the data placement is handled automatically by the database server. When a partition is "deleted", the underlying storage mechanism, such as the files that hold the actual data, will be removed permanently; this in turn will remove the individual transaction records; the transaction records need not be individually deleted.

The term "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in the step are finished without requiring a user to provide input to a processor.

VII. Implementation Notes and Technical Notes

The above discussion has assumed that the reader has a sufficient technical background for appreciating the points made. This section provides some supplementary implementation and/or technical notes which discuss some technical information that may be relevant.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for a self-archiving database have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

The detailed descriptions which appear above may be presented in terms of program procedures executed on a computer or network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format, using XML. Although HTML, and XML, may be a preferred display format, it is possible to utilize alternative display formats for interacting with a user and obtaining user instructions.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the present invention contemplates the use of an operator to access the invention, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will appear from the description given herein.

It should be noted that the term "computer system" or "computer" used herein denotes a device sometimes referred to as a computer, laptop, personal computer, personal digital assistant, personal assignment pad, server, client, mainframe computer, or equivalents thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A self-archiving database system, comprising:
a storage memory storing a transaction database; and
a processor cooperatively operable with the storage memory, and configured to
provide, in the database system, archive table data that specifies (i) archive parameters which indicate both a pre-defined archive time period and a transaction table value or foreign key reference based on which a periodic archive procedure is performed to archive transaction records from the transaction database into an archive database, and (ii) purge parameters which indicate both a pre-defined purge time period and a transaction table value or foreign key reference based on which a periodic purge procedure is performed to purge transaction records from the archive database, the archive table data supporting global configuration for both archive and purge;
in response to the archive parameters indicating that a next time period for archive is reached, in the database system:
create, in the transaction database, a new partition which is used as a live partition into which the database system stores transaction records which are new to and reside in the transaction database;
move, using a database partition feature, from the transaction database to the archive database, a transaction database partition which is determined to be expired, wherein the transaction records residing in the expired transaction database partition become members of a newest archive database partition of and reside in the archive database; and
based on the purge parameters indicating that a next time period for purging is reached, in the database system:
remove, using the database partition feature, from the archive database, an archive database partition which is determined to be expired, wherein data residing in the archive database partition is deleted as a whole from the archive database based on the archive database partition being removed.

2. The self-archiving database system of claim 1, wherein the purge parameters or archive parameters further indicate a partition range or partition interval.

3. The self-archiving database system of claim 1, wherein the processor is further configured to create a global configuration table that has details on table level archive and purge parameters which can be configured at a schema level for tables in the transaction database, and which can be customized as table level parameters.

4. The self-archiving database system of claim 1, further comprising a structured query language (SQL) statement that specifies the archive parameters for a time based archive.

5. The self-archiving database system of claim 1, further comprising an SQL statement that specifies the archive parameters based on a reference approach.

6. The self-archiving database system of claim 1, further comprising a structured query language (SQL) statement that specifies the purge parameters for a time based purge.

7. The self-archiving database system of claim 1, further comprising an SQL statement that specifies the purge parameters based on a reference approach.

8. The self-archiving database system of claim 1, further comprising a purge-archive column type specific to archiving or purging, which causes the processor to automatically archive a transaction table which is determined to include the purge-archive column.

9. The self-archiving database system of claim 1, wherein the processor is further configured to create the archive table based on archive parameters defined in a transaction table of the transaction database.

10. A computer-implemented method for a self-archiving database, in a database system, wherein a storage memory stores the transaction database, comprising:
providing, in the storage memory, archive table data that specifies, for a transaction database, archive parameters which indicate both a pre-defined archive time period and a transaction table value or foreign key reference based on which a periodic archive procedure is performed to archive transaction records from the transaction database into an archive database and purge parameters which indicate both a pre-defined purge time period and a transaction table value or foreign key reference based on which a periodic purge procedure is performed to purge transaction records from the archive database, the archive table data supporting global configuration for both archive and purge;
in response to the archive parameters indicating that a next time period for archive is reached, by the database system:
creating, in the transaction database, by the database system using a database partition feature, a new partition which is used as a live partition into which the database system stores transaction records which are new to and reside in the transaction database;
performing, by the database system, a partition move, using the database partition feature, from the transaction database to the archive database, a transaction database partition which is determined to be expired, wherein the transaction records residing in the expired transaction database partition become members of and reside in a newest archive database partition of the archive database; and
based on the purge parameters indicating that a next time period for purging is reached, by the database system:
removing, by the database system, using the database partition feature, from the archive database, an archive database partition which is determined to be expired, wherein data residing in the archive database partition is deleted as a whole from the archive database based on the archive database partition being removed.

11. The method of claim 10, wherein the purge parameters or archive parameters further indicate a partition range or partition interval.

12. The method of claim 10, further comprising creating a global configuration table that has details on table level archive and purge parameters which can be configured at a schema level for tables in the transaction database, and which can be customized as table level parameters.

13. The method of claim 10, further comprising a structured query language (SQL) statement that specifies the archive parameters for a time based archive.

14. The method of claim 10, further comprising an SQL statement that specifies the archive parameters based on a reference approach.

15. The method of claim 10, further comprising a structured query language (SQL) statement that specifies the purge parameters for a time based purge, or an SQL statement that specifies the purge parameters based on a reference approach.

16. The method of claim 10, further comprising a purge-archive column type specific to archiving or purging, which causes the processor to automatically archive a transaction table which is determined to include the purge-archive column.

17. The method of claim 10, further comprising creating the archive table based on archive parameters defined in a transaction table of the transaction database.

18. A non-transitory computer-readable medium comprising instructions for execution by a computer, wherein the instructions implement the method of claim 10.

* * * * *